(12) United States Patent
Brokenshire et al.

(10) Patent No.: US 7,805,579 B2
(45) Date of Patent: Sep. 28, 2010

(54) METHODS AND ARRANGEMENTS FOR MULTI-BUFFERING DATA

(75) Inventors: Daniel A. Brokenshire, Round Rock, TX (US); Michael B. Brutman, Rochester, MN (US); Gordon C. Fossum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/831,502

(22) Filed: Jul. 31, 2007

(65) Prior Publication Data

US 2009/0037653 A1 Feb. 5, 2009

(51) Int. Cl.
G06F 12/00 (2006.01)
(52) U.S. Cl. .................. 711/152; 711/148; 711/156; 710/22; 710/24; 710/28
(58) Field of Classification Search .................. 711/152, 711/148, 156; 710/22, 24, 28
See application file for complete search history.

(56) References Cited

U.S. PATENT DOCUMENTS 5,802,287 A * 9/1998 Rostoker et al. ......... 370/395.5
7,167,181 B2 * 1/2007 Duluk et al. ................ 345/506

OTHER PUBLICATIONS

Bartlett, Jonathan, "Programming high-performance applications on the Cell BE processor, Part 5: Programming the SPU in C/C++," (http://www-128.ibm.com/developerworks/power/library/pa-linuxps3-5/, Mar. 20, 2007, p. 12.

Scarpazza, Daniele P., et al., Dr. Dobb's Portal, "Programming the Cell Processor," (http://www.drdobbs.com/article/printableArticle.jhtml;jsessionid=AARO3LW1Y1HPJQE1GHOSKH4ATMY32 JVN?articleId=197801624&dept_url=/high-performance-computing/), Mar. 9, 2007, p. 5.

Kurzak, Jakub, et al., "HowTo: Huge TLB pages on PS3 Linux," Mike Action, (http://cellperformance.beyond3d.com/articles/2007/01/howto-huge-t1b-pages-on-ps3-linux.html), Jan. 30, 2007, p. 6.

* cited by examiner

Primary Examiner—Stephen C Elmore
(74) Attorney, Agent, or Firm—Matthew W. Baca; Schubert Law Group PLLC

(57) ABSTRACT

Embodiments may comprise logic such as hardware and/or code within a heterogeneous multi-core processor or the like to coordinate reading from and writing to buffers substantially simultaneously. Many embodiments include multi-buffering logic for implementing a procedure for a processing unit of a specialized processing element. The multi-buffering logic may instruct a direct memory access controller of the specialized processing element to read data from some memory location and store the data in a first buffer. The specialized processing element can then process data in the second buffer and, thereafter, the multi-buffering logic can block read access to the first buffer until the direct memory access controller indicates that the read from the memory location is complete. In such embodiments, the multi-buffering logic may then instruct the direct memory access controller to write the processed data to other memory.

20 Claims, 4 Drawing Sheets

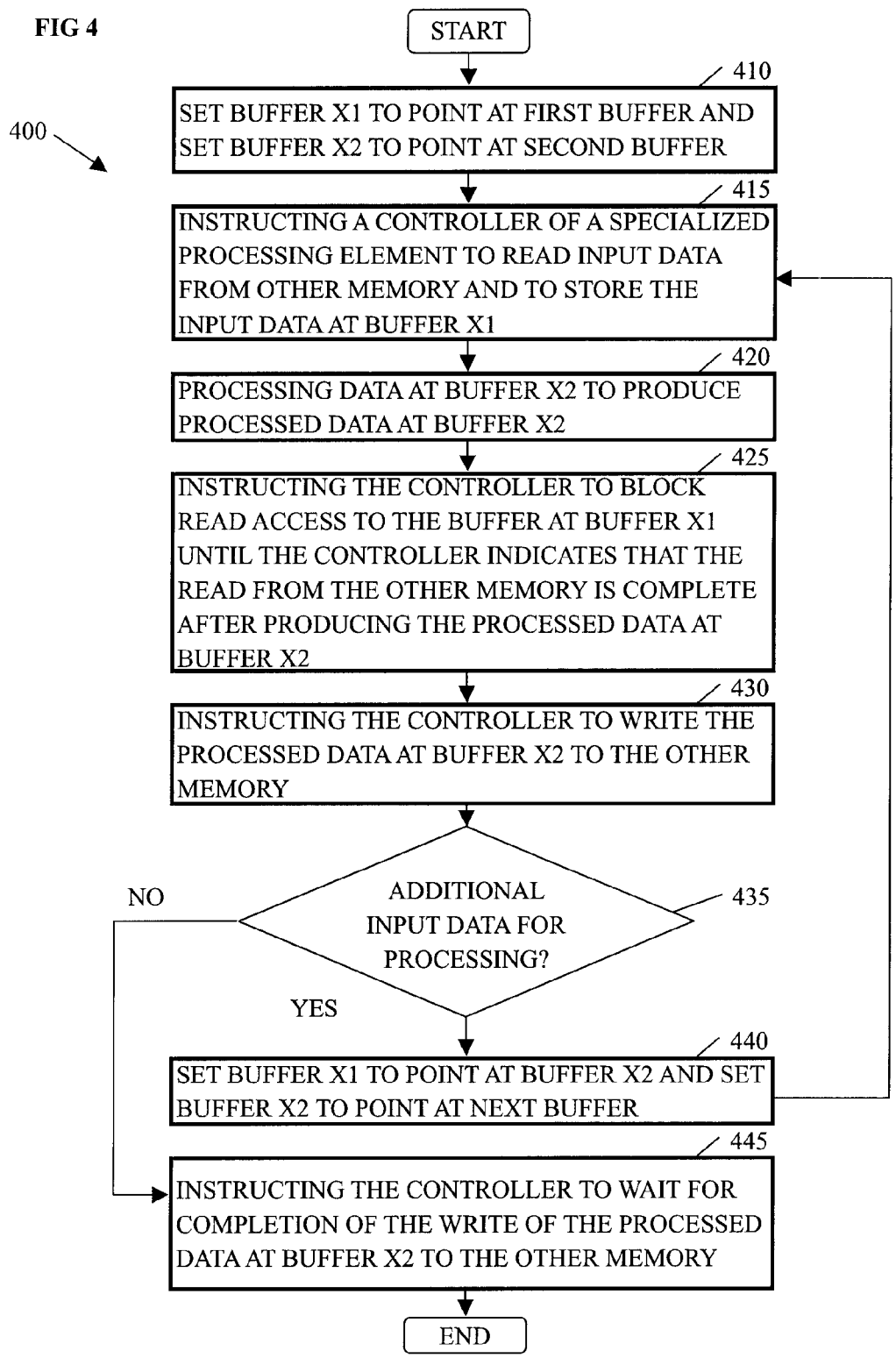

METHODS AND ARRANGEMENTS FOR MULTI-BUFFERING DATA

FIELD

The present disclosure relates generally to heterogeneous multi-core processing technologies. More particularly, the present disclosure relates to methods and arrangements for buffering data with two or more buffers such that data may be read from and written into local memories of processing units substantially simultaneously.

BACKGROUND

Heterogeneous multi-core processors are types of processors that utilize parallel processing within the same chip package. The basic configuration of a heterogeneous multi-core processor includes a general processing element, and multiple specialized processing elements. The general processing elements and specialized processing elements are linked together by an internal high-speed bus. Heterogeneous multi-core processors are designed to be scalable for use in applications ranging from hand held devices to high-end game consoles and mainframe computers, as well as input-output (I/O) devices.

An example of a heterogeneous multi-core processor is a Cell Broadband Engine™ (a trademark of Sony Computer Entertainment, Inc.), which includes one general processing element referred to as a "power processing element" (PPE) and up to eight specialized processing elements referred to as "synergistic processing elements" (SPEs) on a single die. Each SPE typically has a main processing unit referred to as a synergistic processing unit (SPU) and a direct memory access controller in a memory flow controller (MFC). The SPEs can perform parallel processing of operations in conjunction with a program running on the PPE. Furthermore, the SPEs and the PPE can access a system memory, a shared memory for the heterogeneous multi-core processor, and local memories for other SPEs.

The SPEs have small local memories (typically about 256 kilobytes), which are referred to as local stores. Code segments of SPE programs, which execute on the SPEs, manage the content of the local stores. In particular, the code segments executing on the SPEs transfer code and data to/from the local stores via the memory flow controllers. The SPEs depend upon the availability of code and data in the local stores for performance.

To maintain a steady flow of code and data for the SPEs, the SPEs typically implement multiple buffers for code, input data, and output or processed data. More specifically, many SPEs implement two or more buffers so input data can be read into the local stores while output data is being processed and written to other memory from the local stores. SPEs execute code to coordinate reading data from and writing data to the buffers of the local stores. Typical code executed to coordinate reading from and writing to the buffers currently incorporate more coded delays than necessary or implement overly burdensome command tag identification structures for commands to track the progress of the commands. Unfortunately, these characteristics unnecessarily reduce the rate at which data can be processed by the SPEs.

SUMMARY OF THE INVENTION

The problems identified above are in large part addressed by methods and arrangements provided herein to collect data from a system in response to an event. One embodiment comprises a method for moving data between a local memory of a specialized processing element and other memory. The method may involve issuing a first command to instruct a DMA controller of the specialized processing element to read input data from the other memory and to store the input data in a first buffer. After issuing the first command, the method may process data in a second buffer to produce processed data to store in the second buffer. after producing the processed data to store in the second buffer, the method may further involve blocking read access to the first buffer until the DMA controller indicates that the read from the other memory is complete. The method may, after initiating the blocking of the read access to the first buffer, issue a second command to instruct the DMA controller to write the processed data to the other memory.

Another embodiment comprises an apparatus for multi-buffering data on a specialized processing element of a heterogeneous multi-core processor. The apparatus may comprise a local memory of the specialized processing element and multi-buffering logic of the specialized processing element. The multi-buffering logic may couple with a direct memory access (DMA) controller to issue a first command to instruct the DMA controller to read input data from other memory other than the local memory and to store the input data in a first buffer of the local memory. The multi-buffering logic may, after issuing the first command, also process data from a second buffer of the local memory to produce processed data to store in the second buffer and, after producing the processed data to store in the second buffer, block read access to the first buffer until the DMA controller indicates that the read from the other memory is complete. Furthermore, after initiating the blocking of the read access to the first buffer, the multi-buffering logic may issue a third command to instruct the DMA controller to write the processed data to the other memory.

Another embodiment comprises a system for multi-buffering data. The system may comprise a system memory to store code and data for execution and a heterogeneous multi-core processor comprising at least one general processing element and at least one specialized processing element. The at least one specialized processing element may comprise a DMA controller and a specialized processing unit coupled with the DMA controller. The specialized processing unit may comprise multi-buffering logic to issue a first command to instruct the DMA controller to read input data from the system memory and to store the input data in a first buffer of the local memory. The multi-buffering logic may also process data from a second buffer of the local memory, after issuing the first command, to produce processed data to store in the second buffer and, after producing the processed data to store in the second buffer, block read access to the first buffer until the DMA controller indicates that the read from the system memory is complete. Furthermore, the multi-buffering logic may, after initiating the blocking of the read access to the first buffer, issue a second command to instruct the DMA controller to write the processed data to the system memory.

Another embodiment includes a computer program product comprising a computer useable medium having a computer readable program, wherein the computer readable program when executed on a computer causes the computer to perform operations. The operations may involve issuing a first command to instruct a DMA controller of the specialized processing element to read input data from the other memory and to store the input data in a first buffer and processing data from a second buffer, after issuing the first command, to produce processed data to store in the second buffer. The operations may, after producing the processed data to store in the second buffer, also involve blocking read access to the first buffer until the DMA controller indicates that the read from the other memory is complete and, after initiating the blocking of the read access to the first buffer, issue a second command to instruct the DMA controller of the specialized processing element to write the processed data to the other memory.

BRIEF DESCRIPTION OF THE DRAWINGS

FIG. 4 illustrates a flow chart of an embodiment for multi-buffering data of a local memory.

DETAILED DESCRIPTION OF EMBODIMENTS

The following is a detailed description of novel embodiments depicted in the accompanying drawings. The embodiments are in such detail as to clearly communicate the subject matter. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements for multi-buffering data on a heterogeneous multi-core processor are described herein. Embodiments may comprise logic such as hardware and/or code within heterogeneous multi-core processor or the like to coordinate reading from and writing to buffers substantially simultaneously. Many embodiments include multi-buffering logic for implementing a procedure for a processing unit of a specialized processing element. The multi-buffering logic may instruct a DMA controller of the specialized processing element to read input data from memory other than the local memory of the specialized processing element and store the input data in a first buffer. The specialized processing element can then process the data from the second buffer and, thereafter, the DMA controller may block read access to the first buffer until the DMA controller indicates that the read from the memory is complete. The DMA controller may block access in response to an instruction to block access or may block access as a result of a change in state. For instance, after transmission of a read request, the specialized processing unit may transition into a sleep mode if a reply to the read request is not received within a certain time period. In such embodiments, the multi-buffering logic may then instruct the DMA controller to write the processed data to other memory. In many embodiments, the multi-buffering logic may also include loop logic to perpetuate the process until all data is processed.

While some of the specific embodiments described below will reference the heterogeneous multi-core processor, those of skill in the art will realize that embodiments of the present disclosure may advantageously be implemented with other configurations with similar multi-buffering issues.

Figure 1:
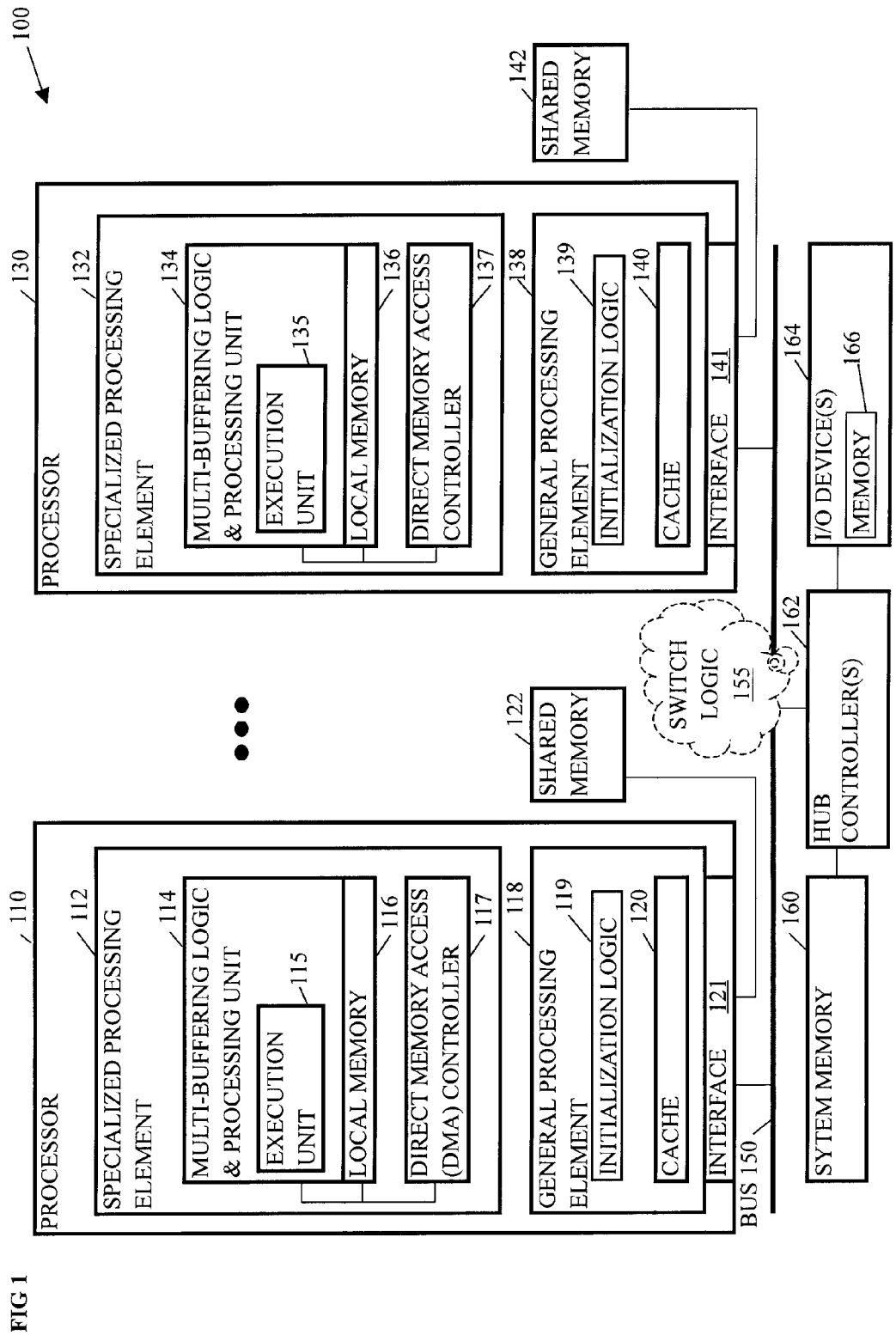
FIG. 1 depicts an embodiment of architecture for a system implementing multiple processors.

Turning now to FIG. 1, there is shown an embodiment of a system 100 implementing multiple processors 110 through 130. System 100 may be a processing device ranging from a music player or other handheld device through a game console, a server, or a component of a supercomputer. System 100 may include two or more processors 110 through 130 coupled with respective shared memories 122 through 142, an arrangement of buses such as bus 150, switch logic 155 (for some embodiments), and hub controller(s) 162 coupled with system memory 160 and I/O device(s) 164.

Processors 110 through 130 shown in FIG. 1 are examples of the heterogeneous multi-core processors, such as the cell broadband engine™ available from International Business Machines, Inc. Each processor of processors 110 through 130 may gather data for processing from internal memories of the processors, shared memories 122 through 142, system memory 160, and memory 166 of I/O device(s) 164. In many embodiments, processors 110 through 130 may be capable of accessing any memory that is mapped. In some embodiments, internal memories of a processor and/or shared memory coupled with that processor may not be accessible by other processors. For example, processor 110 may be capable of accessing data processed by processor 130 residing in local memory 136, and shared memory 142. Depending upon the configuration of system 100, however, processor 130 may not have access to local memory 116, cache 120, cache 140, and/or shared memory 122. In other configurations, the access rights between processors 110 through 130 may be reciprocal. In further embodiments, processor 110 may indirectly access a line in cache 140 by, for instance, attempting a read from an invalid line of system memory 160 that is associated with the line of cache 140.

Processors 110 through 130 may each comprise specialized processing elements such as specialized processing elements 112 through 132 and at least one general processing element such as general processing elements 118 through 138. In one embodiment, for example, processor 110 may comprise eight specialized processing elements and one general processing element. Furthermore, processors 110 through 130 may each comprise an interface, such as interfaces 121 through 142. Interfaces 121 through 141 may each comprise at least one coherent interface and/or at least one incoherent interface for communications with external devices such as memories. In the present embodiment, interfaces 121 through 141 have both coherent and incoherent interfaces. The coherent interfaces interconnect the processors 110 through 130 (via switch logic 155 in some embodiments) and the incoherent interfaces interconnect processors 110 through 130 with shared memories 122 through 142 and hub controller(s) 162.

Specialized processing element 112 may be one of multiple processing elements within processor 110, which are designed to independently or interdependently process data in their associated local memories. For instance, in some embodiments, specialized processing element 112 may independently process data in local memory 116.

Specialized processing element 112 comprises multi-buffering logic 114, local memory 116, and a direct memory access (DMA) controller 117. Multi-buffering logic 114 may gather code and data from external memories such as cache 116, a local memory of another specialized processing element within processor 110, shared memory 112, local memory 136, cache 140, shared memory 142, system memory 160, and/or memory 166 of I/O devices 164. Substantially simultaneously, multi-buffering logic 114 may process and store the data in local memory 116, and write the processed data to one of the other memories of system 100 via DMA controller 117.

Multi-buffering logic 114 may read data from and write data to local memory 116 by buffering the data with one or more buffers in local memory 116. For instance, multi-buffering logic 114 may perform the following procedure utilizing a first buffer and a second buffer of local memory 116. Multi-buffering logic 114 may issue initialization commands to read data into the second buffer of local memory 116 and initialize blocking of read access to the second buffer of local memory 116 until this read is complete. Multi-buffering logic 114 may then issue a first command instructing DMA controller 117 to read input data from, e.g., system memory 160 hundreds to thousands of cycles prior to a scheduled processing of the input data by execution unit 115, depending upon the latencies involved with obtaining data from system memory 160. In some embodiments, the input data may be copied into shared memory 122 or other local memory prior to the instruction to move the input data into a first buffer of local memory 116. In many embodiments, the input data is transmitted from system memory 160 to the first buffer of local memory 116.

After issuing the first command, multi-buffering logic 114 may substantially simultaneously process data stored in a second buffer of local memory 116 and store the processed data in the second buffer. Multi-buffering logic 114 may then sleep until a reply is received from DMA controller 117 indicating that the read of input data into the first buffer is complete, which blocks read access to the first buffer until DMA controller 117 replies. Sleeping may result from a hardware configuration in some embodiments, or an explicit command in other embodiments. After receiving the reply, multi-buffering logic 114 may issue a second command to instruct DMA controller 117 to write the processed data to system memory 160 or another memory location.

Upon issuing the second command, multi-buffering logic 114 may exit this procedure or continue to process data. For situations in which specialized processing element 112 does not have additional data to process, multi-buffering logic 114 may wait for the completion of the second command and then exit the procedure. If specialized processing element 112 does have additional data to process, loop logic of multi-buffering logic 114 may change the pointers for the first buffer and the second buffer, respectively, to point at the second buffer and the first buffer, respectively, switching the roles of the buffers. The loop logic may then repeat the above procedure. On the other hand, when more than two buffers are utilized for the data of local memory 116, the loop logic of multi-buffering logic 114 may change the pointers for the first buffer and the second buffer, respectively, to point at the second buffer and the third buffer, respectively, of local memory 116 before repeating the procedure.

In the present embodiment, multi-buffering logic 114 is integrated with a specialized processing unit. For instance, multi-buffering logic 114 may comprise logic such as state machines or other processing hardware and/or firmware or other embodiment of code to manage two or more buffers for local memory 116. In some embodiments, multi-buffering logic 114 is executable code loaded into and executing on a specialized processing unit. In other embodiments, multi-buffering logic 114 is firmware and/or state machines coupled with or within a specialized processing unit of specialized processing element 112.

Multi-buffering logic 114 may comprise an execution unit 115 to process the data of local memory 116. Execution unit 115 may comprise even and odd processing pipelines with multiple units to process input data and output processed data to local memory 116.

General processing element 118 may be, e.g., a general-purpose, dual-threaded, 64-bit RISC processor that conforms to, e.g., the PowerPC™ Architecture, version 2.02, with the Vector/SIMD Multimedia Extensions. General processing element 118 may be responsible for overall control of processor 110. For instance, general processing element 118 may comprise initialization logic 119 to load code embodying at least a portion of the multi-buffering logic 114 for execution by execution unit 115 of multi-buffering logic 114. General processing element 118 executes the operating system(s) for all applications running on general processing element 118 and the specialized processing elements of processor 110 such as specialized processing elements 112.

General processing element 118 may comprise two main units: a general processing unit and a storage subsystem unit. For instance, a processor that conforms to the PowerPC™ Architecture may comprise a PowerPC™ processing unit, which executes the instructions, and a PowerPC™ processor storage subsystem unit, which handles memory requests from the PowerPC™ processing unit and external requests to the general processing unit from specialized processing units or I/O devices. General processing element 118 may also comprise cache 120. For example, multi-buffering logic 134 may issue an instruction to DMA controller 137 to read data from system memory 160 into a first buffer of local memory 136. In some situations, the line of system memory 160 may be invalid because a newer version exists in cache 120.

DMA controller 137 may comprise a command queue to receive the command to await execution with other commands received at DMA controller 137. Execution of the command may involve transmission by a DMA request unit of DMA controller 137 of a transaction to read the data from system memory 160. In some embodiments, hub controller(s) 162 may wait to respond to the request until the newer version of the data is written to system memory 160 from cache 140 or at least wait until the newer version of the data is transferred from cache 140 to a queue for system memory 160 to await storage in system memory 160. Hub controller(s) 162 may receive the request for the data and may read the corresponding data from system memory 160 or the queue of system memory 160 and respond to the transaction with a transaction including the requested data. DMA controller 137 may receive the newer version of the data and store the data in the first buffer of local memory 136. Multi-buffering logic 134 may then have access to the data in the first buffer of local memory 136.

In many embodiments, processor 130 may comprise an architecture with elements and functionality similar to that of processor 110. In other embodiments, processor 130 and/or other processors of system 100 may have different architectures with different capabilities. In the present embodiment, processor 130 may comprise one or more specialized processing elements such as specialized processing element 132 and one or more general processing elements such as general processing element 138. Specialized processing element 134 may comprise multi-buffering logic 134 with execution unit 135, which has substantially the same capabilities and functionality as multi-buffering logic 114. Specialized processing element 132 may also comprise a DMA controller 137 to facilitate access for multi-buffering logic 134 to memories other than local memory 136. General processing element 138 may comprise a PowerPC™ Architecture, initialization logic 139 to load code embodying at least a portion of the multi-buffering logic 134 for execution by execution unit 135 of multi-buffering logic 134. General processing element 138 may also comprise cache 140 to maintain instructions and/or data of, e.g., the operating system in close proximity to the general processing unit of general processing element 138 to minimize latencies for access to the instructions and/or data.

Bus 150 may be one or more high-speed buses coupled with coherent interfaces of interfaces 121 through 141 for communications between processors 110 through 130 via switch logic 155. Bus 150 may also comprise one or more buses coupled with incoherent interfaces of interfaces 121 through 141 and hub controller(s) 162. In the present embodiment, hub controller(s) 162 process communications between system memory 160 and processors 110 through 130, I/O device(s) 164 and processors 110 through 130, and I/O device(s) 164 and system memory 160.

Switch logic 155 comprises logic to coordinate communications between multiple processors such as processor 110 and 130. Switch logic 155 may interconnect the coherent interfaces such as interfaces 121 and 141 of two or more processors such as processor 110 and 130 to direct transactions from one processor to a designated destination processor via, e.g., interconnect buses within the processors and bus 150. For embodiments with only two processors, the coherent interfaces may be connected directly without switch logic 155, which is denoted in FIG. 1 by the dashed lines embodying switch logic 155. In further embodiments, interfaces 121 and 141 may include logic to facilitate similar interconnections between two or more processors with or without additional logic such as switch logic 155. For example, multi-buffering logic 114 may issue a command to DMA controller 117 to retrieve data from local memory 136. DMA controller 117 may associate a DMA transaction with a real address associated with local memory 136 and place the DMA transaction on bus 150 via interface 121. Switch logic 155 may recognize the destination of the DMA transaction as processor 130 and direct the DMA transaction to interface 141. Interface 141 may transfer the DMA transaction into a proxy command queue of DMA controller 137 to retrieve the data from local memory 136. Upon retrieving the data from local memory 136, DMA controller 137 may transmit the data to processor 110 via bus 150. Again, switch logic 155 may identify that transaction as being destined for processor 110 so switch logic 155 may transmit the transaction to interface 121.

Hub controller(s) 162 may comprise memory and I/O hub controllers to order and, in some embodiments, to prioritize transactions to and from I/O devices 164 and system memory 160. In one embodiment, hub controller(s) 162 may also comprise a graphics controller to facilitate direct memory access between system memory 160 and I/O devices 164.

System memory 160 may comprise memory shared by I/O devices 164 and processors 110 through 130. System memory 160 may store portions of code for execution by processors 110 through 130 prior to requests for the code by from DMA controllers such as DMA controllers 117 and 137.

I/O devices 164 may be devices and drivers for devices such as displays, touch screens, printers, keyboards, key pads, game controllers, game pads, track pads, joy sticks, other hand held controllers, hard drives, compact disk drives, digital versatile disc drives, flash drives, other data storage media, and/or the like. I/O devices 164 may comprise memory 166. Memory 166 may be memory of, e.g., a peripheral component interface card and may be accessible by multi-buffering logic 114 and 134 via DMA controllers 117 and 137, respectively.

Figure 2:
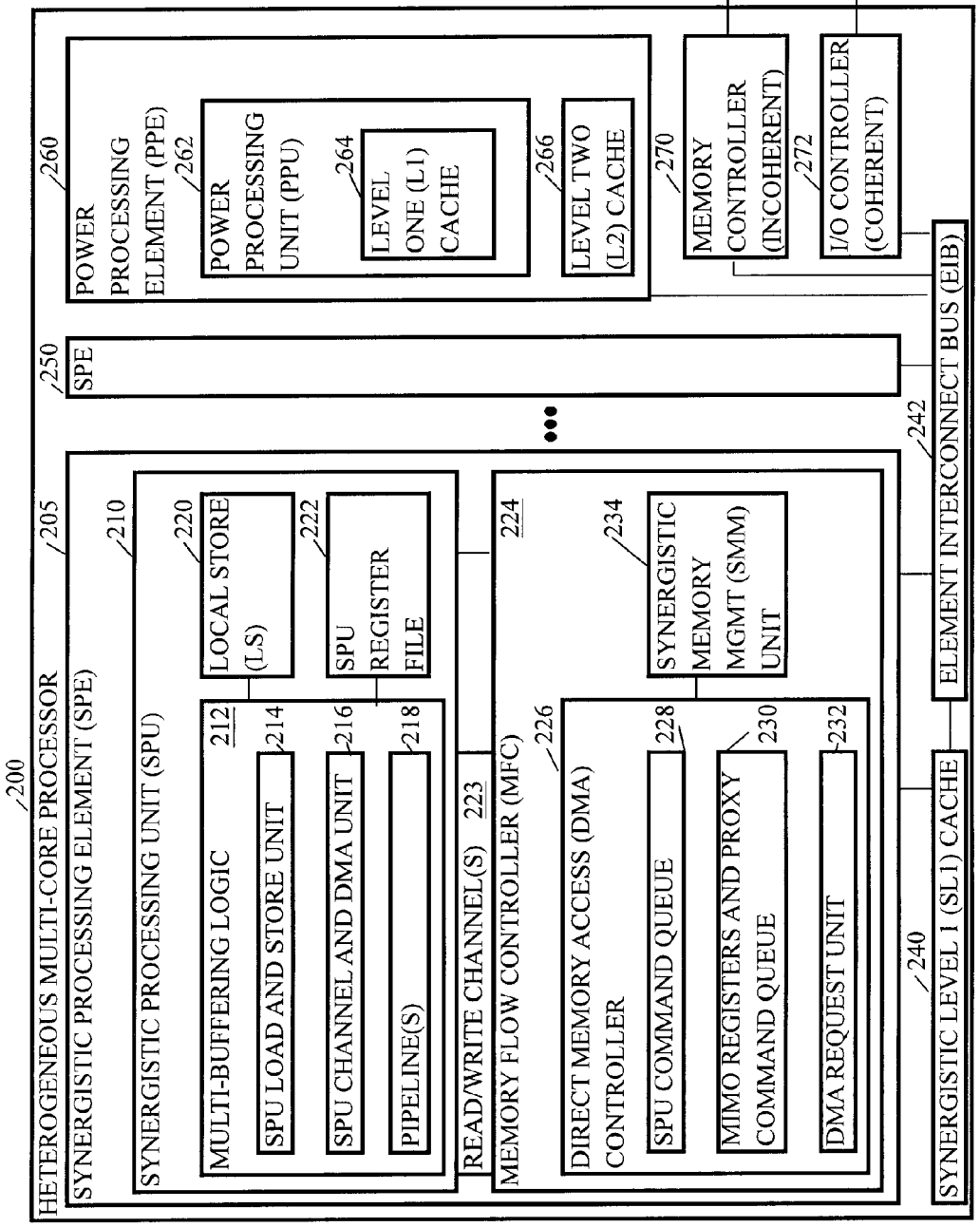
FIG. 2 depicts an embodiment of a heterogeneous multi-core processor.

Turning now to FIG. 2, there is shown a block diagram of a heterogeneous multi-core processor 200. Heterogeneous multi-core processor 200 may be a system-on-a-chip such that each of the elements depicted in heterogeneous multi-core processor 200 may be provided on a single application-specific integrated circuit (ASIC), which is also commonly referred to as a die. In other embodiments, elements of heterogeneous multi-core processor 200 may be distributed across a number of dies within the same chip package or in separate chip packages.

Heterogeneous multi-core processor 200 includes a heterogeneous arrangement of specialized processing elements referred to as synergistic processing elements (SPEs) 205-250 and a general processing element referred to as a power processing element (PPE) 260. The instruction set for the SPEs 205-250 may be different from the instruction set of the PPE 260. For example, PPE 260 may execute reduced instruction set computer (RISC) based instructions while the SPEs 205-250 may execute vectorized instructions.

Each of the synergistic processing elements (SPEs) 205-250 comprise a synergistic processing unit (SPU) such as SPU 210, read and write channels such as read/write channel(s) 223, and a memory flow controller (MFC) such as MFC 224. Synergistic processing units (SPUs) may each comprise multi-buffering logic such as multi-buffering logic 212, a local memory such as local store 220, and an SPU register file 222. In some embodiments, SPUs may be initialized with a first code segment by power processing element (PPE) 260. Thereafter, PPE 260 may manage task assignments for the SPUs while the SPUs execute code and process data for heterogeneous multi-core processor 200.

Multi-buffering logic 212 may comprise logic for coordinating the use of buffers in local store 220 for receiving code and data from other memory as well as storing processed data in other memory. The other memory may include any memory internal or external to heterogeneous multi-core processor 200 for which MFC 224 maintains a memory map. For instance, multi-buffering logic 212 may be code, which, when executed, coordinates the use of two buffers for receiving and processing data substantially simultaneously. Similarly, the code may coordinate transmission of processed data to other memory while substantially simultaneously processing code stored in one of the buffers. In particular, multi-buffering logic 212 may receive data at a first buffer while processing data stored in a second buffer, write the data from the second buffer to shared memory 280, and read new input data into the second buffer while processing the data stored in the first buffer. Furthermore, multi-buffering logic 212 may comprise two buffers to coordinate for each unit of memory that may be processed by SPU 210 at any given time. In particular, if local store 220 comprises four units of memory that may be processed at any given time, multi-buffering logic 212 may coordinate substantially simultaneous use of two or more buffers for each of the four units of memory that can be processed at any given time.

In the present embodiment, multi-buffering logic 212 is integrated with a synergistic execution unit. For instance, in some embodiments, multi-buffering logic 212 may comprise firmware and a synergistic execution unit. In other embodiments, multi-buffering logic 212 may comprise hardware to implement logic for coordinating the use of two or more buffer for each unit of memory in local store 220 that may be processed at substantially the same time.

Multi-buffering logic 212 may comprise an SPU load and store unit 214, an SPU channel and DMA unit 216, and pipeline(s) 218. SPU load and store unit 214 may load data from local store 220 and store the data in SPU register file 222 for processing. SPU load and store unit 214 may also load processed data from SPU register file 222 and store the processed data in local store 220 for further processing or for transmission to another memory such as a local store of another SPE or shared memory 280.

Local store 220 is a local memory to receive and transmit data between SPEs and other memory locations such as local stores of other SPEs, caches for PPE 110, system memory for data processing system 100, memory for input-output (I/O) interfaces and/or devices, and/or other memories mapped via MFC 224. In the present embodiment, local store 220 communicatively couples with SPU load and store unit 214.

In some embodiments, local store 220 may be a 256 kilobyte, error checking and correcting (ECC) protected channel, single-ported, non-caching memory. Local store 220 may store all instructions and data used by SPU 210 and may support one access per cycle from either SPE software or DMA transfers. In such embodiments, SPU instruction prefetches may be 128 bytes per cycle, SPU data-access bandwidth may be 16 bytes per cycle, and DMA-access bandwidth may be 128 bytes per cycle. Furthermore, DMA transfers may perform a read-modify-write of local store 220 for writes of less than a quadword.

In many embodiments, a program running on synergistic processing unit 210 may only reference its own local store 220 using a local store address. However, each synergistic processing unit's local store is also assigned a real address within the overall system's memory map. Assignment of the real address allows privileged software to map a local store to the effective address (EA) of a process to facilitate DMA transfers between the local store of one synergistic processing unit and the local store of another synergistic processing unit. In such embodiments, PPE 260 may also directly access local store 220 of synergistic processing unit 210 using an effective address.

DMA data transfer commands issued by MFC 224 may use one local store address and one effective address. For instance, a local store address issued by MFC 224 may directly address local store 220 because local store 220 is within the same synergistic processing element 205. Similarly, a local store address stored in a command queue of SPE 250 would address a local store within SPE 250. However, the effective address may be arranged to access any other memory storage area in the system, including local stores of the other synergistic processing elements.

SPU load and store unit 214 may execute load and store instructions and load branch-target-buffer (BTB) instructions. SPU load and store unit 214 may also handle DMA requests to local store 220. For instance, SPU load and store unit 214 may load data from a first buffer of local store 220 to process the data while SPU channel and DMA unit 216 issues a command to MFC 224 to initiate a DMA transaction to read data from synergistic level one (SL1) cache 240 into a second buffer of local store 220. SPU load and store unit 214 may then store the processed data back into the first buffer and while SPU channel and DMA unit 216 issues a command to MFC 224 to initiate a DMA transaction to write the processed data from the first buffer of local store 220 into shared memory 280.

SPU channel and DMA unit 216 may enable communication, data transfer, and control into and out of SPU 210 via read/write channels 223. In particular, SPE software communicates with shared memory 280, external buses/devices 282, PPE 260, and other SPEs such as SPE 250 through read/write channels 223. Read/write channels 223 may comprise dedicated read channels and dedicated write channels. Channels may be unidirectional message-passing interfaces that support, e.g., 32-bit messages and commands. Each SPE has its own set of channels. SPE software accesses channels with special channel-read and channel-write instructions that enqueue MFC commands. In many embodiments, writing a tag identification for a command to a write channel may enqueue the command in a command queue of a memory flow controller such as MFC 224. Tag identifications may comprise one or more bits to identify commands so multi-buffering logic 224 may query MFC 224 for the completion status of the command or group of commands associated with a particular tag identification.

Pipelines 218 may comprise execution pipelines for execution of instructions. For instance, SPU 210 can issue and complete up to two instructions per cycle, one on each of the two (odd and even) execution pipelines. Whether an instruction goes to the odd or even pipeline depends on the instruction type. The instruction type is also related to the execution unit that performs the function. For example, SPU load and store unit 214 may load data from a first set of buffers and a second set of buffers to execute in parallel. The data from the first set of buffers may comprise fixed-point or floating point operations that can execute on the even pipeline while the instruction from the second set of buffers may be a fixed point operation that can execute on the odd pipeline.

Each SPU such as SPU 210 comprises a memory flow controller such as MFC 224. MFC 224 serves as the SPU's interface, by means of an element interconnect bus (EIB) 242, to main-storage and other processing elements such as SPE 250 and PPE 260 and system devices. MFC 224 interfaces local store 220 with other memories via a DMA controller that moves instructions and data between local store 220 and other memories.

MFC 224 may comprise, for example, a DMA controller 226 coupled with a synergistic memory management unit (SMM) 234. For example, multi-buffering logic 212 may issue a first command to instruct MFC 224 to read input data from shared memory 280 and to store the input data in a first buffer of local store 220. The first command may be transferred from multi-buffering logic 212 by SPU channel and DMA unit 216 through a write channel of read/write channels 223 to a channels and SPU command queue 228 of DMA controller 226. DMA request unit 232 may obtain a mapping or address for the input data from SMM 234 and transmit the request for the input data to memory controller 270 to retrieve the input data from shared memory 280. Multi-buffering logic 212 may initiate the DMA request hundreds of cycles prior to a need to process the input data.

After issuing the first command, while awaiting the input data, multi-buffering logic 212 may process data in a second buffer of local store 220 to produce processed data to store in the second buffer. Many embodiments load initial input data into the second buffer of local store 220 and block read access to the second buffer until the loading is complete as an initialization process, which occurs prior to issuing the first command. In several of these embodiments, issuance of the first command is the first procedure of a loop that repeats to process additional data. After producing the processed data to store in the second buffer, SPU 210 may sleep, blocking read access to the first buffer of local store 220 by multi-buffering logic 212 and SPU load and store unit 214 until MFC 224 indicates that the read from shared memory 280 is complete. In other embodiments, multi-buffering logic 212 may issue a block command to instruct MFC 224 to block access to the first buffer after producing the processed data in the second buffer to await a reply from MFC 224 to indicate completion of the read of the input data into the first buffer. Thereafter, multi-buffering logic 212 may enqueue a second command in channels and SPU command queue 228 to instruct MFC 224 to write the processed data of the second buffer in local store 220 to shared memory 280.

Each command issued may be associated with a tag identification by multi-buffering logic 212. In many embodiments, each command issued by multi-buffering logic 212 is assigned the same tag identification. In some embodiments, the tag identification is unique and set by default for commands associated with each unit of memory that is being independently processed by SPU 210 at any given time. For instance, if SPU 210 can independently process 10 units of memory substantially simultaneously, 10 sets of buffers will be assigned to those units and a default, unique tag identification may be associated with each set of buffers. In other words, commands to read data into or write data from a set of buffers will be assigned matching tag identifications.

DMA controller 226 may comprise SPU command queue 228, multiple-input-multiple-output (MIMO) registers and proxy command queue 230, and DMA request unit 232. SPU command queue 228 provides an interface for SPU 210 to request DMA transfers to/from local store 220 from/to other memories internal and external to heterogeneous multi-core processor 200. Commands issued by multi-buffering logic 212 are transferred to SPU command queue 228 through read/write channels 223. These commands provide the main method that enables code executing in SPU 210 to access shared memory 280 and maintain synchronization with other processors and devices in heterogeneous multi-core processor 200. Commands may also be provided to manage optional caches such as SL1 cache 240. Commands to manage optional caches can either be issued by code running on SPU 210, or by code running on another processor or device, such as PPE 260.

MIMO registers and proxy command queue 230 is an interface that may comprise MMIO registers or control registers, including local store memory and DMA enqueue registers, which are mapped the real address space of heterogeneous multi-core processor 200. This interface may allow access to the MFC facilities from any processor, or any device in heterogeneous multi-core processor 200. This interface may also allow direct access to local store 220 from any processor or any device in heterogeneous multi-core processor 200 such as SPE 250, enabling local-store-to-local-store transfers, e.g., by SPE 250, and the ability for I/O devices to directly access the local store 220 of SPU 210 via I/O controller 272.

PPE 260 may manage SPE 205 and initiate DMA transfers by programming MMIO registers and storing DMA requests in a proxy command queue of MIMO registers and proxy command queue 230. PPE 260 can also load an SPE program for execution by SPE 205 through MIMO registers and proxy command queue 230.

DMA request unit 232 can execute commands in the SPU command queue 228 to move data between local store 220 and other memory. Optionally, DMA request unit 232 can store data in the SL1 cache 240.

SMM 234 may hold and process memory protection and access permission information. For instance, SMM 234 may use a memory mapping unit to maintain memory mapping for each memory accessible by SPU 210, perform address translations and access protection checks required for the DMA transfers, and grant permission to accesses from multi-buffering logic 212 based upon memory protection metrics implemented for heterogeneous multi-core processor 200.

SL1 cache 240 may be a first level cache for DMA transfers between local store 220 and other memory such as shared memory 280. Some embodiments may not include SL1 cache. Other embodiments may comprise more than one level of cache for DMA transfers.

A high-bandwidth internal element interconnect bus (EIB) 242 interconnects SPEs 205-250 with each other, a synergistic level one (SL1) cache 240, PPE 260, memory controller 270, and I/O controller 272. Element interconnect bus 242 provides a communication path between all of the processors on heterogeneous multi-core processor 200 and the external interface controllers attached to element interconnect bus 242 such as memory controller 270 and I/O controller 272.

Memory controller 270 provides an interface between element interconnect bus 242 and one or more of extreme data rate I/O cell memory channels for shared memory 280. In particular, shared memory 280 may be an extreme data rate dynamic random access memory (DRAM), which is a high-speed, highly serial memory provided by Rambus™.

I/O controller 272 handles commands that originate in an I/O interface device and that are destined for the coherent element interconnect bus 242. An I/O interface device, which is depicted as external buses and devices 282, may be any device or bus that is accessed in a coherent manner and attaches to an I/O interface such as an I/O bridge chip. The I/O interface may attach multiple I/O devices or another heterogeneous multi-core processor like heterogeneous multi-core processor 200. I/O controller 270 may also intercept accesses on element interconnect bus 242 that are destined to memory-mapped registers that reside in or behind an I/O bridge chip or heterogeneous multi-core processor, and route the accesses to the proper I/O interface.

PPE 260 comprises a power processing unit (PPU) 262 with level one (L1) and level two (L2) caches 264 and 266. PPE 260 may be a dual threaded processing element. In some embodiments, the combination of the dual threaded PPE 260 and SPEs 205-250 may allow heterogeneous multi-core processor 200 to handle, e.g., 10 simultaneous threads and over 128 outstanding memory requests. PPE 260 acts as a controller for SPEs 205-250, which handle most of the computational workload. For example, PPE 260 may be used to run conventional operating systems while the SPEs 205-250 perform vectorized floating point code execution.

PPE 260 may load SPEs 205-250 with small programs or threads, chaining the SPEs together to handle each step in a complex operation. For example, a set-top box incorporating heterogeneous multi-core processor 200 may load programs for reading a DVD, video and audio decoding, and display, and the data would be passed off from SPE to SPE until it finally ended up on the output display. In some embodiments, an SPE may even encrypt communications on behalf of a kernel executing within heterogeneous multi-core processor 200 prior to transmission of the communications to devices external to the chip of heterogeneous multi-core processor 200.

Figure 3:
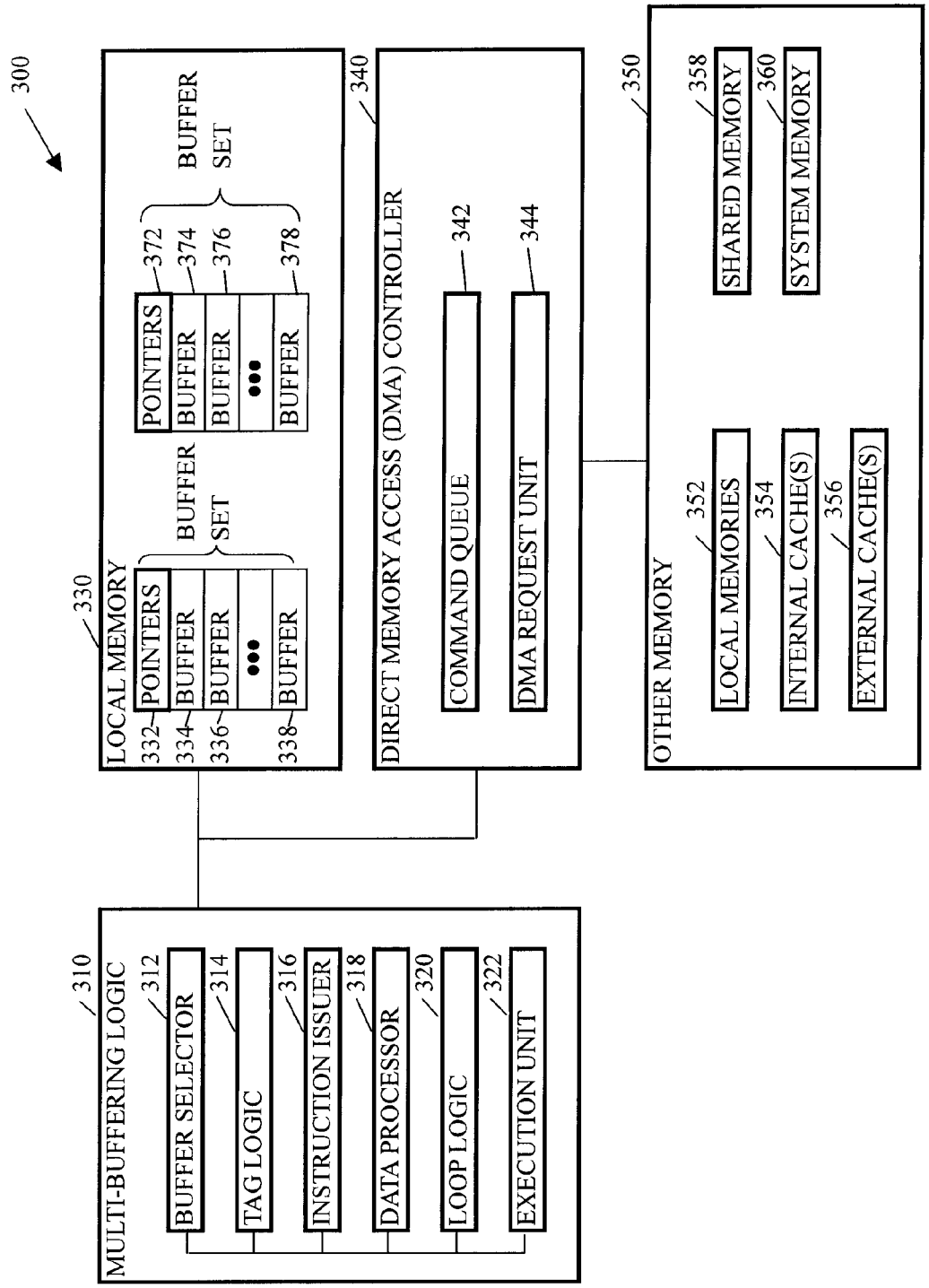
FIG. 3 illustrates an embodiment of an apparatus with logic for multi-buffering data of a local memory.

Turning now to FIG. 3, there is shown an embodiment of an apparatus 300 with multi-buffering logic 310 for multi-buffering data of a local memory 330. Apparatus 300 may multi-buffer data on a specialized processing element of a heterogeneous multi-core processor such as processor 110 in FIG. 1 or broadband engine 200 in FIG. 2. Apparatus 300 may comprise multi-buffering logic 310, local memory 330, direct memory access controller 340, and other memory 350.

Multi-buffering logic 310 may comprise logic such as code, hardware, or a combination thereof to manage data for processing via two or more processors. In other embodiments, multi-buffering logic 310 comprises code in a transmission form to create an installable form of the code to install on a hard drive to load into at least one of the memories for execution by execution unit 322 of the specialized processing element.

In the present embodiment, multi-buffering logic 310 manages data for processing via more than two buffers, i.e., buffers 334 through 338. For example, multi-buffering logic 310 may couple with a direct memory access (DMA) controller 340 to issue a first command to instruct the DMA controller 340 to read input data from other memory 350 and to store the input data in buffer 334 of local memory 330. Multi-buffering logic 310 may process data already stored in buffer 336 of local memory 330 to produce processed data in buffer 336 after issuing the first command. After producing the processed data in buffer 336, multi-buffering logic 310, or a subunit thereof, may sleep, effectively blocking read access to the buffer 334 by multi-buffering logic 310, or a subunit thereof, until DMA controller 340 indicates that the read from other memory 350 is complete. After issuing the second command, multi-buffering logic 310 may issue a third command to instruct DMA controller 340 to write the processed data to other memory 350.

Multi-buffering logic 310 may comprise buffer selector 312, tag logic 314, instruction issuer 316, data processor 318, loop logic 320, and execution unit 322. Buffer selector 312 may select at least two buffers within local memory 330 based upon pointers 332. For instance, in the example above, a first pointer of pointers 332 may be associated with buffer 334 to indicate that buffer 334 is a first buffer and a second pointer may point to buffer 336 to indicate that buffer 336 is a second buffer.

Once DMA controller 340 writes the processed data from buffer 336 to other memory 350, loop logic 320 may, e.g., modify the first point to point at buffer 338 and modify the second pointer to point at buffer 334. Then, multi-buffering logic 310 may issue a third command to instruct the DMA controller 340 to read subsequent data from other memory 350 and to store the subsequent data in buffer 338; process the input data from buffer 334, after issuing the third command, to produce additional data to store in buffer 338; sleep, after producing the additional data to store in buffer 338, which blocks read access to buffer 334 by SPU load and store unit 214 of multi-buffering logic 212 until DMA controller 340 indicates that the read of the subsequent data from other memory 350 is complete; and issue a fourth command to instruct DMA controller 340 to write the additional data to other memory 350 after blocking read access. Loop logic 320 may continue to associate pointers with buffers in a manner that rotates the buffers in an endless loop until no more input data is to be processed. For instance, (ignoring the buffers that are not numbered in the FIG. 3) loop logic 320 may modify the pointers to point to buffers 336 and 338 respectively, and then to 334 and 336 respectively, as described above, which completes the loop.

In some embodiments, multi-buffering logic 310 may perform similar operations with additional sets of buffers substantially in parallel with the operations above such as the set of buffers comprised of pointers 372 and buffers 374 and 376 through 378.

DMA controller 340 couples with the multi-buffering logic 310 to receive commands to transfer data to/from local memory 330 from/to other memory 340. DMA controller 340 comprises at least one command queue 342 to receive and store DMA commands until executed and at least one DMA request unit 344 to execute the DMA commands.

Tag logic 314 may associate the commands issued by multi-buffering logic 310 with matching tag identifications to associate the commands with the same tag group. In many embodiments, commands associated with buffers 334 through 338 may be associated with a distinct tag identification from the tag identification associated with commands for buffers 372 through 378. In other embodiments, the tag identifications for all commands issue to DMA controller 340 may be the same or matching tag identifications.

Instruction issuer 316 may issue instructions or commands to DMA controller 340 for DMA transfers of data to and from local memory 330. Instruction issuer 316 may couple with tag logic 314 to store tag identifications with the commands in command queue 342.

Other memory 350 comprises one or more local stores 352 of other specialized processing elements, a memory of an I/O device, internal caches 354, external caches 356, a shared memory 358, and a system memory 360. Input data retrieved by DMA controller 340 may reside in one or more of such memories.

FIG. 4 illustrates a flow chart 400 of an embodiment for multi-buffering data of a local store. Flow chart 400 starts at element 410 with setting a pointer, buffer X1, to point at a first buffer and a pointer, buffer X2, to point at a second buffer. Note also that input data is read into the second buffer prior to the start of flow chart 400. In further embodiments, flow chart 400 may issue initialization commands to read data into buffer X2 and to block access to buffer X2 until the read is completed.

At element 415, multi-buffering logic instructs a DMA controller of a specialized processing element to read input data from other memory and to store the input data in the buffer associated with buffer X1. Instructing the DMA controller to read input data may involve issuing or enqueuing a first command into a command queue of a DMA controller by writing a tag identification to a DMA write channel. The multi-buffering logic then processes data at buffer X2 and stores the processed data into the buffer associated with buffer X2 (element 420).

After producing the processed data at buffer X2, at element 425, the multi-buffering logic sleeps, blocking read access to the buffer at buffer X1 until the controller indicates that the read from the other memory is complete. The multi-buffering logic then instructs the controller to write the processed data at buffer X2 to the other memory (element 430). Instructing the controller to write the processed data may involve writing an equivalent tag identification to the DMA write channel as was written for prior instructions to the DMA controller.

If there is additional data to process (element 435), loop logic of the multi-buffering logic may set buffer X1 to point at buffer associated with buffer X2 and set buffer X2 to point at the next buffer to be used, which may be the same buffer that was originally associated with buffer X1 (element 440). Then, multi-buffering logic may instruct the controller to read input data from other memory into buffer X1 (element 415). In the present embodiment, there is an inherent pause between writing from a buffer and reading into the same buffer. Thus, the controller will not try to store data read from other memory into the buffer associated with buffer X1 until the write to this buffer, which was initiated at element 430, is completed. Upon completion of the write, the read from the other memory will be initiated.

On the other hand, if no more data is to be processed at element 435, the multi-buffering logic may instruct the controller to wait for completion of the write from the buffer associated with buffer X2 to the other memory (element 445) and then end until another SPE program reinitiates the multi-buffering logic.

Another embodiment of the invention is implemented as a program product for implementing systems and methods described with reference to FIGS. 1-4. The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates methods and arrangements for multi-buffering data. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for moving data between a local memory of a specialized processing element and other memory, the method comprising:
   issuing a first command to instruct a direct memory access controller of the specialized processing element to read input data from the other memory and to store the input data in a first buffer;
   after issuing the first command, processing data from a second buffer to produce processed data to store in the second buffer;
   after producing the processed data to store in the second buffer, blocking read access to the first buffer until the direct memory access controller indicates that the read from the other memory is complete; and
   after initiating the blocking of the read access to the first buffer, issuing a second command to instruct the direct memory access controller to write the processed data to the other memory.

2. The method of claim 1, further comprising:
   issuing a third command to instruct the direct memory access controller to read subsequent input data from the other memory and to store the subsequent data in the second buffer;
   processing the input data stored in the first buffer, after issuing the third command, to produce other data in the first buffer;
   after producing the other data to store in the first buffer, blocking read access to the second buffer until the direct memory access controller indicates that the read of the subsequent data from the other memory is complete; and after initiating the blocking of the read access to the second buffer, issuing a fourth command to instruct the direct memory access controller to write the other data to the other memory.

3. The method of claim 2, further comprising:
prior to issuing the first command, issuing a prior command to read initial input data into the second buffer and blocking read access to the second buffer until the direct memory access controller indicates that the read of the initial input data into the second buffer is complete; and
repeating the method from issuing the first command through issuing the fourth command in a loop.

4. The method of claim 1, further comprising waiting for the writing of the processed data to the other memory to complete.

5. The method of claim 1, wherein issuing the first command comprises enqueing the first command, wherein enqueing the first command comprises writing a tag identification to a direct memory access channel.

6. The method of claim 1, wherein issuing the commands comprises associating the first and second commands with matching tag identifications.

7. The method of claim 6, wherein associating the first and second commands with matching tag identifications comprises writing equivalent tag identifications to a direct memory access channel for the first and second commands.

8. An apparatus for multi-buffering data on a specialized processing element of a heterogeneous multi-core processor, the apparatus comprising:
a local memory of the specialized processing element; and
multi-buffering logic of the specialized processing element to couple with a direct memory access (DMA) controller to issue a first command to instruct the DMA controller to read input data from other memory other than the local memory and to store the input data in a first buffer of the local memory; after issuing the first command, to process data from a second buffer of the local memory to produce processed data to store in the second buffer; after producing the processed data to store in the second buffer, to block read access to the first buffer until the DMA controller indicates that the read from the other memory is complete; and after initiating the blocking of the read access, to issue a second command to instruct the DMA controller to write the processed data to the other memory.

9. The apparatus of claim 8, further comprising the DMA controller coupled with the multi-buffering logic, the DMA controller comprising at least one DMA request unit to execute the commands.

10. The apparatus of claim 8, wherein the multi-buffering logic comprises tag logic to associate the commands with matching tag identifications.

11. The apparatus of claim 8, wherein the multi-buffering logic comprises loop logic to:
after issuing the second command, issue a third command to instruct the DMA controller to read subsequent data from the other memory and to store the subsequent data in the second buffer;
process the input data in the first buffer, after issuing the third command, to produce additional data to store in the first buffer;
block read access to the second buffer after producing the additional data in the first buffer, until the DMA controller indicates that the read of the subsequent data from the other memory is complete; and
after initiating the blocking of the read access, issue a fourth command to instruct the DMA controller to write the additional data to the other memory.

12. The apparatus of claim 8, wherein the multi-buffering logic comprises code to install on a hard drive to load into at least the local memory or the other memory for execution by an execution unit of the specialized processing element.

13. The apparatus of claim 8, wherein the other memory comprises at least another local memory, a memory of an I/O device, and a system memory, and the input data is to reside in one or more of the at least another local memory, the memory of the I/O device, and the system memory.

14. A system for multi-buffering data, the system comprising:
a system memory to store code and data for execution; and
a heterogeneous multi-core processor comprising at least one general processing element and at least one specialized processing element, wherein the at least one specialized processing element comprises:
a direct memory access controller; and
a specialized processing unit coupled with the direct memory access controller and comprising a local memory, the specialized processing unit comprising multi-buffering logic to issue a first command to instruct the direct memory access controller to read input data from the system memory and to store the input data in a first buffer of the local memory; after issuing the first command, to process data from a second buffer of the local memory to produce processed data to store in the second buffer; after producing the processed data to store in the second buffer, to block read access to the first buffer until the direct memory access controller indicates that the read from the system memory is complete; and after initiating the blocking of the read access, to issue a second command to instruct the direct memory access controller to write the processed data to the system memory.

15. The system of claim 14, wherein at least one general processing element comprises initialization logic to load code embodying at least a portion of the multi-buffering logic for execution by the specialized processing unit.

16. The system of claim 14, wherein the multi-buffering logic is to issue a third command, after issuing the second command, to instruct the direct memory access controller to read subsequent data from the system memory or a second local memory of a second specialized processing element and to store the subsequent data in the second buffer; to process the input data from the first buffer, after issuing the third command, to produce other data to store in the first buffer; to block read access to the second buffer after producing the other data to store in the first buffer, until the direct memory access controller indicates that the read of the subsequent data from the system memory or the second local memory is complete; and after initiating the blocking of the read access, to issue a fourth command to instruct a direct memory access controller of the at least one specialized processing element to write the other data to the system memory or the second local memory.

17. A computer program product comprising a tangible, computer useable storage medium having a computer readable program, wherein the computer readable program when executed on a computer causes the computer to:
issue a first command to instruct a direct memory access controller of the specialized processing element to read input data from the other memory and to store the input data in a first buffer;

after issuing the first command, process data from a second buffer to produce processed data to store in the second buffer;

after producing the processed data to store in the second buffer, block read access to the first buffer until the direct memory access controller indicates that the read from the other memory is complete; and after initiating the blocking of read access to the first buffer, issue a second command to instruct a direct memory access controller of the specialized processing element to write the processed data to the other memory.

18. The computer program product of claim 17, wherein the computer readable program when executed on a computer further causes the computer to:

issue a third command, after issuing the second command, to instruct the direct memory access controller to read subsequent input data from the other memory and to store the subsequent data in the second buffer;

process the input data from the first buffer, after issuing the third command, to produce other data to store in the first buffer;

block read access to the second buffer after producing the other data to store in the first buffer, until the direct memory access controller indicates that the read of the subsequent data from the other memory is complete; and issue a fourth command, after initiating blocking of the read access to the second buffer, to instruct the direct memory access controller of the specialized processing element to write the other data to the other memory.

19. The computer program product of claim 17, wherein causing the computer to issue the commands comprises causing the computer to associate the commands with matching tag identifications.

20. The computer program product of claim 19, wherein causing the computer to associate the first and second commands with matching tag identifications comprises causing the computer to write equivalent tag identifications to a direct memory access channel.

* * * * *